United States Patent [19]

Mitchell

[11] 4,375,881
[45] Mar. 8, 1983

[54] PORTABLE DESK FOR USE WITH AUTOMOBILE STEERING WHEEL

[76] Inventor: Stephen A. Mitchell, West Newton, Mass.

[21] Appl. No.: 227,590

[22] Filed: Jan. 23, 1981

[51] Int. Cl.³ .................................................. A47B 19/00
[52] U.S. Cl. ................................... 248/441 B; 108/44
[58] Field of Search ................... 108/44, 43, 13, 62; 224/276; 248/441 B; 206/127; D19/52, 88; D12/155

[56] References Cited

U.S. PATENT DOCUMENTS

| | | | |
|---|---|---|---|
| 1,733,293 | 10/1929 | Brow | 224/276 X |
| 2,487,536 | 11/1949 | Fiscus | 108/44 X |
| 2,810,221 | 10/1957 | Reifsnyder | 224/276 X |
| 3,011,802 | 12/1961 | Ackerman | 224/276 X |
| 3,074,745 | 1/1963 | Bruckhalter | 108/44 |
| 3,643,606 | 2/1972 | Vise | 108/44 |
| 3,695,703 | 10/1973 | Notko | 297/442 |
| 3,952,988 | 4/1976 | Easterly | 108/44 X |

FOREIGN PATENT DOCUMENTS

| | | | |
|---|---|---|---|
| 552881 | 2/1958 | Canada | 108/44 |
| 885350 | 11/1971 | Canada | 224/276 |
| 1232973 | 5/1960 | France | 108/44 |
| 1416622 | 7/1965 | France | 108/44 |
| 1122364 | 8/1968 | United Kingdom | 108/44 |

Primary Examiner—James T. McCall
Attorney, Agent, or Firm—Dahlen & Gatewood

[57] ABSTRACT

A portable desk of thin compact design which is not only reversible, making both sides thereof suitable for use as a writing surface, but also is easily attachable and removeable from the rim of an automobile or truck steering wheel as and when desired. The portable desk includes a pocket for holding index cards and the like.

9 Claims, 3 Drawing Figures

PORTABLE DESK FOR USE WITH AUTOMOBILE STEERING WHEEL

BACKGROUND OF THE INVENTION

1. Field of the Invention

The present invention relates to a flat, compact, portable desk adapted for easy removeable attachment to the rim of an automobile or truck steering wheel.

2. Description of the Prior Art

Over the years there has been recognized the need for a portable desk by salespersons, realtors, truckers, and other business persons who commonly use their automobiles, trucks, or vans for business purposes.

As a result of that need, a variety of portable desks for support by an automobile or truck steering wheel have been suggested. Examples of these are disclosed in U.S. Pat. Nos. 2,487,736; 3,074,745; 3,281,109; 3,932,988; and U.S. Pat. No. Des. 199,241.

Typically, the portable desks used in combination with vehicular steering wheels have been somewhat cumbersome to use or store or have not been readily and simply attachable/detachable from the steering wheel. In some instances, the means for holding the portable desk in association with the steering wheel have not been overly satisfactory, as they have been too susceptible to damage, or overly complicated.

In U.S. Pat. No. 2,487,536 there is disclosed a desk attachment for automobile steering wheels in which the desk is supported by two spaced-apart supports, each of which at one end is provided with a hooked part for association with the outer rim of the steering wheel. The supports are bolted to the underneath side of the desk and provide for that writing support surface to be disposed upwardly at an angle to the plane of the steering wheel. Portions of the supports which contact the steering wheel surface are provided with a cushioning material such as a rubber tubing which not only provides a protective coating, but a non-skid surface as well.

U.S. Pat. No. 3,074,745 discloses a portable desk which is supported on the steering wheel by means of a wire bracket means which can also serve as a book holder. In U.S. Pat. No. 3,281,109 there is shown a one piece writing board of plastic or composition material in which upper portions thereof are rounded and curved downwardly, providing means for attachment of the board to the steering wheel rim.

As in U.S. Pat. No. 3,281,109, the steering wheel desk in U.S. Pat. No. 3,952,988 is of one piece construction. And a pair of integral downwardly projecting means are provided for engaging the upper part of the steering wheel rim. U.S. Pat. No. Des. 199,241 discloses a writing surface of somewhat square configuration in which what appears to be adjustable clamping means are provided at each of the four corners for association of the desk with the steering wheel.

None of the portable steering wheel desks or writing boards of which I am aware, however, provide for reversibility. As a matter of fact their vary construction, particularly the means by which they are held to and supported by the steering wheel makes it impossible for both sides of the desk to be used as a surface for writing notes, filling out reports, log books, etc.

Neither do any of the portable steering wheel desks of which I am aware include a pocket or compartment for the storing and holding of writing materials such as index cards, or a log book, sales pads and the like. U.S. Pat. No. 3,937,101 does, however, disclose a steering wheel with a pad container. In that patent, the central portion of the steering wheel is recessed so as to provide a container for holding a writing pad and pencil.

SUMMARY OF THE INVENTION

There is provided by my invention a compact, simple portable desk for support on, and by the rim of, an automobile or truck steering wheel not having the disadvantages of prior such portable desks or writing boards.

Quite advantageously, the steering wheel desk of my invention can be readily and easily attached to a steering wheel for support in use, and readily removed therefrom as desired. Advantageously, the portable desk of the invention is reversible, adding to its facility in use. The desk is not only flat, but thin and compact in structure, making it easily storable, e.g., under the seat of an automobile when not being used.

My desk, as disclosed herein, provides not only a flat surface for the writing of notes, etc., but quite advantageously includes a hidden, unobtrusive packet for containing and storing writing materials such as conventional, so-called "index cards".

As the desk of the invention is portable, it can be removed from the car or truck as desired, and used additionally as a writing support surface on construction jobs, in class rooms, by salesmen, etc.

In its more basic aspects, the portable, reversible desk of the invention comprises top and bottom planar surfaces suitable for supporting writing materials on which notes, etc. are to be written, defined by a top edge in which is provided a pocket open along the edge for containing and storing writing materials, and means provided in combination with the top and bottom surfaces for supporting and holding of the desk in association with the rim of the steering wheel.

In its more preferred aspects, the portable desk of the invention comprises top and bottom planar surfaces defined by a rectangular configuration having a top edge and a bottom edge and in the top of which is provided a pocket of suitable size for holding index cards or the like.

DETAILED DESCRIPTION OF THE DRAWINGS AND THE PREFERRED EMBODIMENTS

Figure 1:
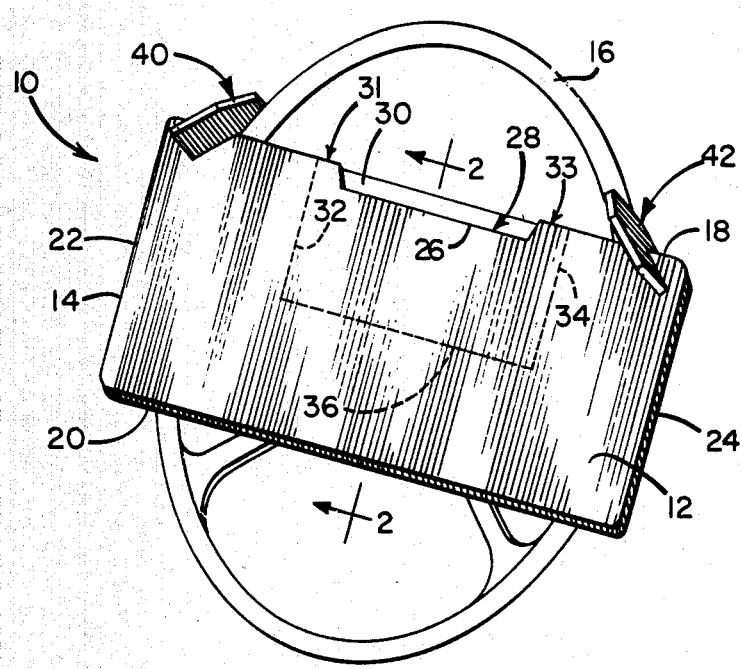
FIG. 1 is a perspective view showing a portable desk of the invention positioned securely over the rim of an automobile steering wheel, and ready for use.

Turning now to the drawing there is shown in FIG. 1 thereof a portable desk 10 of uniform thickness comprising an inner core 11 and having smooth, planar top and bottom outer surfaces 12, 14 for the support of writing materials such as conventional index cards or the like, supported on and held to automobile steering wheel 16.

As shown in FIG. 1, portable desk 10 is of rectangular configuration defined by elongated top and bottom edges 18, 20 and side edges 22, 24. Top edge 18 is preferably indented somewhat in its central portion, as indicated, providing mid-portion top edge 26, parallel to both top edge 18 and bottom edge 20, the reason for which will later be made clear, if not already obvious.

In top edge 18, there is provided pocket 28 for the holding of index cards or the like 30. Pocket 28, as shown by the drawing, is basically of rectangular shape and is defined by side edges 32, 34, and bottom edge 36. As shown, along top edge 18 pocket 28 is recessed (indicated by reference numbers 31, 33) between top and bottom surfaces 12, 14. However, this need not necessarily be the case. Mid-portion top edge 26 can, if desired, extend to pocket side edges 32, 34.

The size of pocket 28, as will be appreciated, can vary as desired; however, in use I have provided a pocket suitable for the holding of 5"×8" conventional index cards. The depth of pocket 28 should be such that when the index cards are located in the pocket, the upper edge of the cards, i.e., the edge of the cards exposed, will be coextensive with the top edge 18 making for a continuity thereof. Thus, indented edge 26 will permit the index cards 30 to be sufficiently exposed for gripping by one's fingers, for easy removal from the pocket. The bottom edge of the cards, as will be appreciated, are supported on bottom edge 36 of the pocket.

Figure 2:
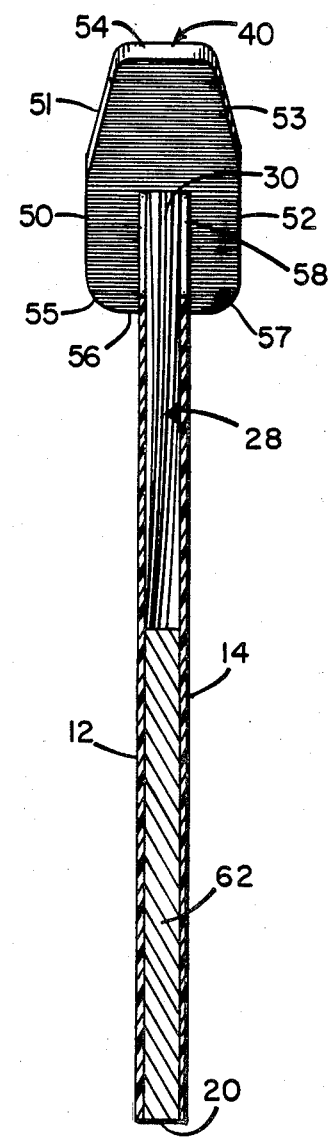
FIG. 2 is a view in cross-section of the desk shown in FIG. 1 taken at secant line 2—2, showing the pocket in the desk and one of the steering wheel holders.

Desk 10, as is readily seen by reference to FIG. 1 is retained in proper location on the rim of steering wheel 16 by holding clips 40, 42. These clips, one of which is shown more clearly in FIG. 2, are essentially of rectangular configuration defined by elongated side edges 50, 52 and top and bottom edges 54, 56, in bottom edge 56 of which is provided rectangular-shaped slot 58. As shown, side edges 50, 52 can taper inwardly toward one another, as indicated by reference numbers 51, 53, terminating at top edge 54. However, this need not be the case. Where the side edges intersect with top edge 54, rounded corners can be provided instead, if desired, as shown by reference numbers 55, 57 in the case of the bottom edge.

Holder clips 40, 42 are slanted inwardly toward one another on the desk, as shown, and are disposed equidistantly on each side of top and bottom surfaces 12, 14.

Thus, portable desk 10 is made reversible and either the top or bottom planar surface 12, 14 can be used for supporting the writing material.

The angle at which holders 40, 42 slant inwardly with respect to one another and top edge 18 can obviously vary, depending somewhat on the size of the desk, the location of the holding clips 40, 42, inwardly from the respective side edges 22, 24 and how high the desk is desired to be held on the rim of steering wheel 16. The main consideration is, of course, that holding clips 40, 42 be at the same acute angle with respect to top edge 18. In the practice of the invention, I have found that if holding clips 40, 42 are at a 45° angle with respect to top edge 18, satisfactory results will be obtained.

Portable desk 10 can vary somewhat in dimension, but in practice, I have found an overall size of approximately 7⅞"×15" to be quite satisfactory. With such a writing board, mid-portion edge 26 will measure 5½" and top edge 18 will measure inwardly from each side edge about 3⅜". The mid-portion edge is indented inwardly about ⅜" from the top edge. The depth of pocket 28 is desirably 5", providing for storage of 5"×8" index cards. Holding clips 40, 42, in this case, will be so located that with respect to top edge 18, each will be located inwardly from the respective side edges 22, 24 about 2 inches. As shown in the drawing, all corners are rounded, to provide not only a more pleasing appearance, but particularly with the four corners of the desk less liklihood of injury from a sharp corner. Moreover, as will be appreciated, particularly with respect to those portions of pocket 28 defined by recesses 31, 33 in top edge 18, rounding of the corners and tapering the edges, where top edge 18 joins to mid-portion edge 26, will result in less chance of these edges being damaged, particularly if there are no index cards in the pocket.

As will be appreciated, desk 10 can be provided of various materials, e.g., wood, metal, or various conventional plastic materials. Where provided of plastics, the desk can, if desired, be manufactured by conventional injection molding techniques. In this case, holding clips 40, 42 can be provided integral with desk 10 and with top and bottom surfaces 12, 14 thereof. Pocket 28 can be provided for during the molding operations. Preferably, however, desk 10 is manufactured simply and economically of a 5/32" tempered masonite core faced with decorative surfaces as hereinafter more fully described.

Figure 3:
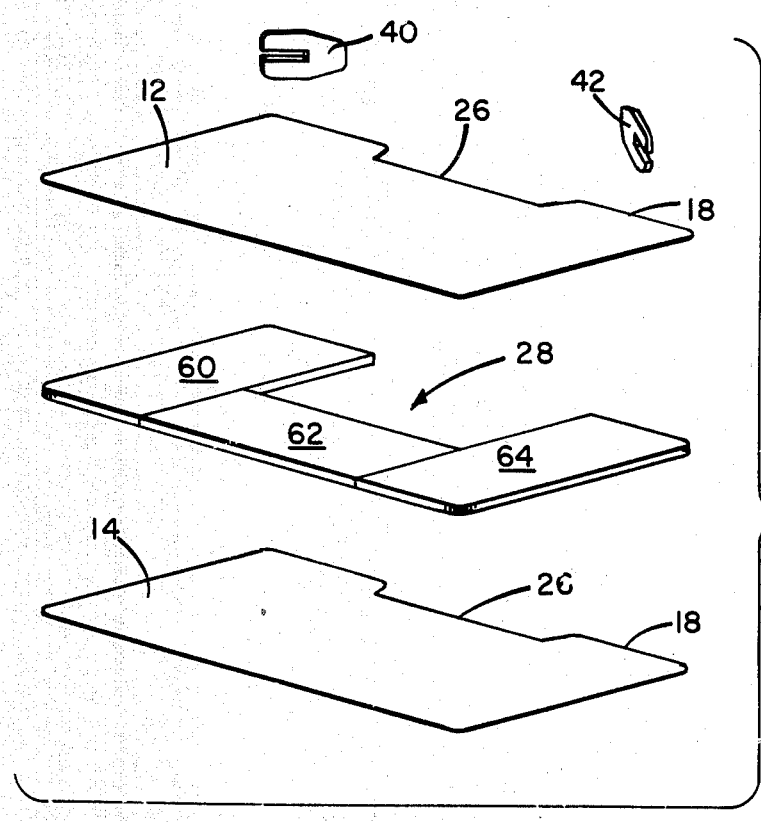
FIG. 3 is an expanded perspective view of a desk according to the invention revealing more readily one manner of manufacture.

Thus, in accordance with the preferred manner of manufacture (FIG. 3), a sheet of tempered 5/32" masonite is cut into three sections 60, 62, 64; sections 60 and 64 measuring 3 7/16"×7⅞", and section 62 measuring 2⅞"×8 1/16". These sections are then assembled together as indicated in FIG. 3 to form inner core 11. Assembly can be accomplished according to usual techniques by placing the three sections in the relationship indicated in a four sided wooden form of suitable size. When the sections are assembled, contact cement is then applied to the exposed upper surfaces thereof. Any such adhesive commonly available can be used. Their manner of application is well known and need not, it is believed, be further described herein.

Meanwhile, top and bottom surfaces 12, 14 are cut from conventional decorative plastic lamina. Many such decorative lamina are readily available commercially, however, those lamina (1/32") having a wood grain matching the dash board or other automobile interior will be found quite satisfactory. As before, contact cement is then applied to that inner surface of top surface 12 which is to be laminated to the inner core 11. When the contact cement is dry, the top decorative surface 12 is then brought into contact with and laminated to core 11. This assembly is then turned over and the process repeated, laminating bottom surface 14 to the inner core. Thus, as will be seen by reference to FIG. 3, pocket 28 is easily and readily provided by this simple manner of manufacture.

However, it will be readily appreciated that the core 11 can be of one piece, if desired, and so cut from the masonite sheet. If desired, moreover, core 11 need not be of masonite; it can be of any pressed particle board, plastic lamina, or even of a foam lamina such as vinyl foam or polystyrene. Holding clips 40, 42 are cut (overall dimension 2 3/16"×3 9/16"×7/32") from three ply laminate as above-described in the manufacture of desk 10 and after slots 58 (5/32"×1¾") are provided therein, the clips are attached to the desk by means of conventional polyurethane adhesive. The top surface of the slots are beveled 45° in the appropriate direction, so as to better fit with top edge 18. The corners of the desk are rounded and the assembled desk is sanded according to usual techniques. Afterwards, the edges only of the desk are coated twice with a lacquer or coating material such as polyurethane, to provide a more mar resistance and pleasing surface, as well as to better ensure overall water resistance.

Obviously, desk 10 can be provided of any thickness desired. This will depend somewhat on the pocket thickness desired. Where thicker pockets are desired, the core can itself comprise masonite provided on each side with foam lamina to reduce the weight of the desk. Pocket 28 can be made smaller or larger to accomodate other sized cards or writing pads, invoices, purchase orders, etc. Also, if desired, desk 10 need not be rectangular shaped; it can be square, increasing somewhat the writing support surface.

The portable desk of the invention can be used with conventional automobile or truck steering wheels simply by placing either top surface 12 or bottom surface 14 on the steering wheel and sliding the desk downwardly until holder clips 40 and 42 firmly engage the wheel rim. Further downward movement of the desk is thereby made impossible. In this position the desk is held securely and firmly to the wheel rim and the rear plane of the desk lies flush against the steering wheel face permitting one to use the exposed desk surface for writing or reading. In use the pocket 28 allows the user to conveniently store standard sized index cards, e.g., 5"×8" cards which may be easily removed from or inserted into pocket 28. Thus, writing material is available when and if needed.

The invention is useful to students, policemen, tradesmen, realtors, homemakers, salesmen and businessmen and anyone who uses his automobile during the business day and who has the need or desire to record or update information before leaving the automobile. The invention can be additionally used as a flat reading or writing board by a user while in the auto or while at home, on the job, in school, etc.

It will be recognized that variations from the above described preferred embodiments are possible without departing from the scope of the invention. Therefore, the invention is not intended to be limited by the foregoing description but rather is limited only as set forth in the claims and equivalents thereof.

What I claim is:

1. A portable reversible desk for detachable mounting on and support by the steering wheel of a motor vehicle comprising;
   (a) an inner core of uniform thickness having top and bottom smooth, planar surfaces for the support of writing material and being defined by an elongated top edge of predetermined length;
   (b) a pocket in said top edge for the holding of writing materials; and
   (c) means for detachably holding the desk to the rim of the steering wheel which comprises a pair of spaced-apart flat, elongated holding clips, one holding clip being located along and perpendicular to the top edge of the desk and at one end thereof so as to be disposed equidistantly on each side of the said top and bottom surfaces and the other holding clip being located along the top edge of the desk at the other end, said flat holding clips being slanted inwardly toward one another and forming an acute angle with the top edge of the desk.

2. A portable reversible desk for detachable mounting on and support by the steering wheel of a motor vehicle as in claim 1 wherein said inner core is of rectangular shape defined by said elongated top edge, a bottom edge and side edges, said top edge being indented at its midportion and said pocket being open at and located inwardly from said mid-portion of the top edge.

3. A portable reversible desk for detachable mounting on and support by the steering wheel of a motor vehicle as in claim 1 wherein the holding clips are slanted inwardly toward one another with respect to the top edge of the desk forming an acute angle of about 45 degrees with the said top edge.

4. A portable reversible desk for detachable mounting on and support by the steering wheel of a motor vehicle as in claim 1 wherein the holding clips are spaced about 10½ inches apart as measured from the point of intersection of each holding clip with the top edge of the desk, and are located equidistant inwardly from the respective ends of the top edge of the desk.

5. A portable reversible desk for detachable mounting on and support by the steering wheel of a motor vehicle as in claim 1 wherein the said inner core is of tempered masonite and the top and bottom surfaces are decorative lamina laminated thereto.

6. A portable reversible desk for detachable mounting on and support by the steering wheel of a motor vehicle as in claim 1 wherein the said inner core is approximately 5/32 inch thick and the surface lamina are each 1/32 inch thick.

7. A portable reversible desk for detachable mounting on and support by the steering wheel of a motor vehicle according to claim 5 wherein the holding clips comprise the same three ply lamination as the the support for the writing material.

8. A portable reversible desk for detachable mounting on and support by the steering wheel of a motor vehicle according to claim 2 wherein the desk measures 7⅞"×15".

9. A portable reversible desk for detachable mounting on and support by the steering wheel of a motor vehicle according to claim 8 wherein said pocket has an opening measuring about 8 inches along the top edge, and is recessed at the top edge between the top and bottom surfaces.

* * * * *